United States Patent Office 3,043,854
Patented July 10, 1962

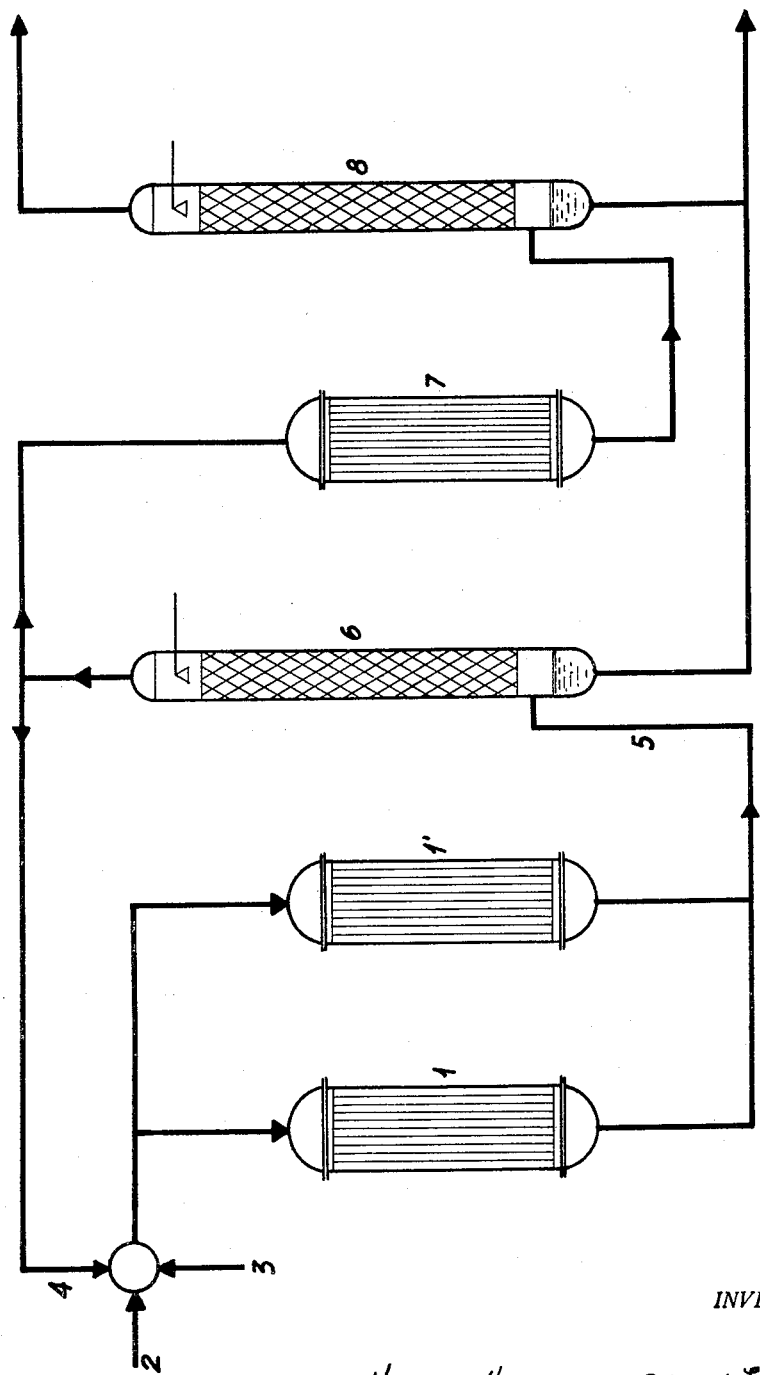

3,043,854
PRODUCTION OF ETHYLENE OXIDE BY CATALYTIC OXIDATION OF OLEFINES
Harry Hermann Alfred Endler, Milan, Italy, assignor to Montecatini Società Generale per l'Industria e Chimica, Milan, Italy, a corporation of Italy
Filed Oct. 17, 1958, Ser. No. 769,277
Claims priority, application Italy Dec. 3, 1954
9 Claims. (Cl. 260—348.5)

The present invention relates to improvements in the production of ethylene oxide by oxidation of olefines in the presence of a silver catalyst.

This application and U.S. application Serial No. 447,664 of Endler and Bulgarelli, filed August 3, 1954, contain common subject matter. All of the subject matter of that application is included herein by reference.

The present application contains subject matter in common with my co-pending applications Serial No. 548,781, filed on November 23, 1955, and Serial No. 608,735, filed on September 10, 1956. Said applications copended with Serial No. 447,664, and became abandoned after the filing of the instant application.

In the co-pending U.S. application, Serial No. 447,664, entitled "Improved Catalyst for the Production of Olefinic Oxides," filed August 3, 1954, a new silver catalyst suitable for the catalytic oxidation of olefines, particularly ethylene and the method of preparing it, was claimed. Said application issued as Patent No. 2,825,701, on March 4, 1958. The catalysts described therein include mixtures of thermic decomposition products of silver carbonate and at least 50 percent of an alkaline earth carbonate such as calcium carbonate. The use of this catalyst is described, wherein an olefine, such as ethylene, is heated in admixture with oxygen-containing gases and in the presence of the claimed catalyst to temperatures between 180 and 300° C., at an oxygen-ethylene ratio between 10:1 and 1:1. In the alternative, the reaction can be carried out at the same temperature, but at an oxygen-ethylene ratio preferably between 14:1, and under pressures between 1 and 20 atm., at a maximum spatial velocity of 1750. In this manner, conversions in excess of 55% as well as yields of 70% and more are obtained.

Another process is known whereby it is possible to oxidize ethylene in the presence of a heated silver catalyst, while maintaining the reaction at a steady rate of production and yield, by mixing the ethylene-oxygen reaction mixture with an inert diluent gas containing, for example, a limited aliquot of carbon dioxide. One way of attaining this is by mixing the entering gases with effluent gases of the process, which still contain a certain amount of unreacted ethylene. In the last-named process, the operation is conducted at a linear velocity between 0.088 and 2.2 cm.³/h. of entering gases per cm.² of catalyst cross section and at a space velocity of 100 to 5000 m.³/h. of gas per each m.³ of catalyst volume. The ensuing reaction gas mixture is scrubbed in order to separate the ethylene oxide, and is mixed with fresh ethylene and oxygen in order to re-establish the reaction requirements. However, by means of this process it is not possible to obtain sufficiently high total yields (maximum about 50%) in view of the fact that the production of ethylene oxide remains below 50 g./h. per liter of catalyst.

I have now found that the process described in the aforementioned, co-pending application Serial No. 447,664, and using the new catalyst claimed therein, can be considerably improved by applying a so-called "high rate of recycling," whereby the larger part of the reaction gas, after the ethylene oxide has been eliminated by scrubbing, is brought back into the reactor, together with fresh air and ethylene, the proportional amount of recycled gases being, however, ten times or more than that of the same fresh gases.

By applying a recycling ratio of such an extent, the catalyst load, i.e., the total flow, is substantially increased, and consequently the linear and spatial velocities. I found that the result of a high rate of recycling is an increase in the ethylene oxide yield per volume/time and, consequently, a substantial increase in the reactor capacity. Obviously, it was not foreseeable that a change of one of the operating factors (space velocity) would be capable of producing, in conjunction with the other operating conditions described in said co-pending application, such a noteworthy increase in yield.

In conjunction with the introduction of a high rate of recycling, it becomes necessary to distinguish between "absolute" and "relative" conversion, depending upon the amount of ethylene upon which the calculation is based. Based on the amount of freshly fed ethylene, absolute conversion equals $$\frac{\text{total ethylene converted into ethylene oxide}}{\text{freshly fed ethylene}}$$

On the other hand, based on the total amount of ethylene (freshly fed and recycled ethylene) entering the reactor, the relative conversion equals $$\frac{\text{ethylene converted into ethylene oxide}}{\text{total amount of ethylene fed}}$$

The high recycling rate, resulting in a higher gas velocity, causes a higher load loss as the gas passes through the catalyst and, in order to contain this load loss within reasonable limits, it is necessary to use a catalyst of larger particle size, without however changing the catalytic activity. A catalyst according to the above-mentioned co-pending application Serial No. 447,664, having a carrier particle size of 9 mm., satisfies these requirements, although its silver content is lower than that of a catalyst having a particle size of 3 mm. Such a catalyst deposited on carborundum as carrier, which has a particle size of 9 mm., is prepared in the following manner.

From an aqueous solution containing silver nitrate and calcium nitrate at a molar ratio of 1:1 to 1:4, silver carbonate and calcium carbonate are precipitated by slowly adding a 10% sodium carbonate solution while stirring. The precipitate is separated, washed several times, and dried in an oven at 108° C. The dry powder is carefully suspended in a 50% aqueous ethylene-glycol solution, and to every 45 parts by weight of the suspended powder, 100 ccm. of granulated green carborundum or any similar refractory material having a particle size of 9 mm. are added. While intimately mixing, vacuum is applied which causes the catalytic powder to homogeneously cover the carborundum particles and excess liquid to be removed. The particles are placed in a muffle oven and heated there to 400° C. for one hour in an atmosphere of rising water-glycol vapors. These particles then contain 20 to 30% of silver and silver oxides and 80 to 70% of calcium carbonate.

This carrier-based catalyst has the following properties:
 (1) The amount of catalytic powder is 35 g./100 ccm. of apparent catalyst volume, and 40% thereof is deposited within the interstices of the porous carrier;
 (2) The thickness of the catalyst film covering the surface of the carrier particles is 430 microns;
 (3) The amount of silver is 80 g./liter of apparent catalyst volume;
 (4) The free space amounts of 49% of the apparent catalyst volume;
 (5) The surface area is 4 cm.² per each ccm. of apparent volume.

The following example illustrates one manner of reducing the invention to practice, but is not presented with any intent of limiting the scope of the appended claims thereby.

A gaseous mixture of oxygen, nitrogen, carbon dioxide and ethylene, containing 4.5% of the latter, is brought into contact with 1000 ccm. of a catalyst contained in a reaction tube, 21 mm. in diameter and 3 meters in height, at a spatial velocity of 7800 Nm.³/h., while maintaining the catalyst at a temperature of about 250° C. and operating under a pressure of 12 atm. The mixture of these gases is obtained by recycling nine-tenths of the effluent gas evolving from the reaction tube from which ethylene oxide has been removed by scrubbing, and passing this recycling gas to the catalysis zone after intimately admixing therewith a quantity of fresh air and ethylene sufficient to maintain the desired ratio of oxygen and ethylene. For example, the amounts may be as follows: ethylene 104 l./h., air 668 l./h., recycling gas 7028 l./h. In this case, an absolute conversion of 55.4%, a relative conversion of 16.7%, and a yield of 75% are obtained. 115 g./h. of ethylene oxide are obtained, which represent a volume capacity of 73.2 g./h. of ethylene converted into ethylene oxide per liter of catalyst and a catalytic capacity of 0.915 kg./h. of ethylene converted into ethylene oxide per 1 kg. of silver present.

Although the optimum temperature of the catalyst is 250° C., slight variations, say from 240° to 260° C., do not seem to be detrimental. Similarly, the pressure at which the process is carried out may vary from 10 to 15 atm. and the space velocity of the gases from 7500 to 10,000 Nm.³/h. per m.³ of catalyst (the term "space velocity" indicating the number of volumes of gas, measured at atmospheric pressure and standard temperature, which, during a given time, pass through a bed of the catalyst of a given volume).

I will now describe the further improvement which was described in my co-pending application Serial No. 608,735.

In the co-pending U.S. patent application Serial No. 548,781 of November 23, 1955, an improved method of operation is described wherein, while using the new catalyst, a high rate of recycling is employed. After the ethylene oxide has been eliminated by scrubbing, the larger part of the reaction gas is brought back into the reaction, together with fresh air and ethylene, whereby the proportional amount of recycled gas is ten times or more than that of the fresh gases. However, inasmuch as in this process a certain amount of the gases must be vented and taken out of the cycle, due to the admission of inerts together with fresh reaction gases at least 15–20% of the ethylene employed must be considered as unavoidably lost.

I have found that it is possible to attain a still higher conversion rate and a substantially complete utilization of the ethylene used in the catalytic conversion, if the olefine and oxygen present in the vented gases are submitted to a further conversion in an additional reactor.

In the catalytic oxidation of olefines, upon passing the reaction mixture over the catalyst, only part of the olefine present is converted to the desired product while another part undergoes complete combustion to carbon dioxide and water. This undesirable complete combustion can impair the economy of the entire process.

Thus, prior processes wherein a final reactor is also used, such as the process disclosed in U.S. Patent No. 2,693,474, are substantially incapable of maximum utilization of the olefine employed. In the additional reactor or reactors wherein the residual olefine is to be converted, the catalysis takes place at a lower yield than in the main reactors because of the poor selectivity for the desired reaction of prior catalysts over a reaction resulting in total combustion. However, when using the silver catalyst described and claimed in said first-named co-pending application, this disadvantage is eliminated because the catalyst possesses inherently such a selectivity for the formation of olefine oxide that, even if the flow rate is varied over a wide range, the catalytic reaction produces the same yield as in the main reactor. In addition to the advantage of a high yield, the present invention offers the further advantage in that, due to the indifference of the catalyst to changes of the flow rate, it is not required to provide each main reactor with one or more additional reactors.

On the contrary, the effluents of several main reactors are preferably combined. According to this disclosure, the additional conversion is carried out independently of the operating conditions of the main reactors. A practically uniform yield can be maintained until the residual olefines are exhausted, even in case of a partial stoppage of one or more of the main reactors. It is obvious that such an arrangement decreases the investment costs to a considerable extent.

The process of this invention is illustrated schematically in the accompanying drawing.

The gaseous mixture, consisting of fresh gases (ethylene and air) and recycling gases, is introduced through the respective inlet pipes 2, 3 and 4 into the individual main reactors 1 and 1', connected in parallel, in the direction indicated by the arrows. At the outlet from the reactors the reaction gases are combined and passed through pipe 5 to the washing tower 6 where the ethylene oxide is separated. After washing, the larger part of the gases is recycled, while the remaining portion is passed through the additional reactor 7. The oxide thus formed is washed out in another column 8, from where the residual gas is expelled into the atmosphere. The number of the main reactors is not limited and, of course, there may also be a single main reactor.

In order to illustrate the present invention, an example is presented which, however, is not to be construed as limiting the invention in any manner.

The following terms, used in the specification, are here defined:

$$\text{Total conversion} = \frac{\text{amount of ethylene converted to ethylene oxide} + CO_2}{\text{fresh ethylene entered}}$$

$$\text{Conversion} = \frac{\text{amount of ethylene converted to ethylene oxide}}{\text{fresh ethylene entered}}$$

$$\text{Yield} = \frac{\text{amount of ethylene converted to ethylene oxide}}{\text{entire ethylene reacted}}$$

The term spatial velocity equals, in reciprocals of time, the ratio between the volume of the catalytic bed and the flow rate in normal volumes per hour.

*Example*

A gaseous mixture having the following composition:

| | Percent |
|---|---|
| $C_2H_4$ | 4.0 |
| $O_2$ | 6.0 |
| $CO_2$ | 6.2 |
| $N_2$ | 83.8 | is contacted with a silver catalyst arranged in a catalytic bed 7 m. in height, at a spatial velocity of 8000 h.⁻¹, at a temperature of 245° C. and under a pressure of 12 atm.

This mixture is obtained by recycling 9/10 of the reaction gas after removal of the ethylene oxide by washing and adding air and fresh ethylene so that the desired concentrations are obtained. The respective amounts of gas, based on one liter of catalyst, are as follows: air 656 Nl./h., ethylene 116 Nl./h., recycling gas 7.228 Nl./h.

In the main reactors a conversion of 65% and a yield of 76% are obtained; this corresponds with a production of 149 g. ethylene oxide per liter of catalyst per hour, and with an oxidation of 95 g. ethylene into ethylene oxide per liter of catalyst per hour. After the ethylene oxide is removed, the gaseous mixture has the following composition:

| | Percent |
|---|---|
| $C_2H_4$ | 2.7 |
| $O_2$ | 4.7 |
| $CO_2$ | 6.9 |
| $N_2$ | 85.6 |

Of this mixture about 600 Nl./h. are vented; in order to utilize the ethylene contained in this effluent, the latter is passed, either as it is or after the addition of air to adjust the oxygen content to 6%, at a spatial velocity of 2000 h.$^{-1}$ through the additional reactor also having a catalyst bed 7 m. in height. 19.1 g. ethylene oxide are obtained per liter of catalyst per hour, corresponding to a conversion of 61.5% and a yield of 73%.

The small amount of residual ethylene, equal to 2.4 g./h., can be expelled to the atmosphere.

The weight balance of ethylene, based on the amount fed per hour, is as follows:

| | G. |
|---|---|
| Ethylene fed | 145 |
| Ethylene converted to oxide in the main reactor | 95 |
| Ethylene converted to oxide in the additional reactor | 12.2 |
| Ethylene converted to $CO_2$ in the main reactors | 30 |
| Ethylene converted to $CO_2$ in the additional reactor | 4.5 |
| Ethylene lost in the final venting, etc | 3.3 |
| Total | 145.0 |

The over-all conversion to ethylene oxide is therefor 74%, whereas, without additional reactor, it would have been 65%. The increased economy of the process is further indicated by the fact that the consumption of ethylene per kg. of ethylene produced is reduced from 1 kg. to 0.86 kg.

Of course, the process of the present invention can be used with various reactor systems and with various catalysts although the best results are achieved with the catalyst of said co-pending application. The number of main reactors can be varied at will in accordance with the design requirements, but from 2 to 5 main reactors are preferably used.

A reactor of any type may be used as additional reactor, although a reactor of the same type and size as the main reactor is preferable for economic reasons.

The catalytic oxidation of ethylene in accordance with the process of the present invention may be carried out at temperatures between 200 and 300° C. and under a pressure between 1 and 20 atm.

Generally speaking, the operative ranges of spatial velocities are 7000 to 20,000 h.$^{-1}$ for the gas passage through the first reactor, and 2000 to 7000 h.$^{-1}$ for the gas passage through the second reactor.

The ethylene and oxygen contents in the gas entering the main reactors may be adjusted so as to have an effluent already suitable to the synthesis in the additional reactor as far as the concentration ratio between the reactants is concerned. For the main reactor, concentrations from 3 to 6% ethylene and from 5 to 8% oxygen are preferably selected. If necessary, the oxygen content of the mixture sent to the additional reactors may be adjusted to the desired value by adding oxygen or oxygen-containing gases.

The silver catalyst hereinbefore mentioned preferably consists of particles about 9 mm. in diameter of a granular, porous refractory material as a carrier, coated with a homogeneous mixture of 20 to 30% silver and 80 to 70% calcium carbonate of a particle size of not more than 5 microns, whereby each 100 ccm. of the granular refractory material contains about 35 g. of the coating.

I claim:

1. A process for preparing ethylene oxide, comprising passing fresh ethylene and fresh air through a plurality of parallelly connected first stage catalytic oxidation zones, scrubbing ethylene oxide from the effluent gases of said first stage zones, removing the ethylene oxide containing scrubbing solution, recycling nine-tenths of the scrubbed effluent gases to the said plurality of first stage zones, and passing the remaining minor amount of the scrubbed effluent gas to a single second stage catalytic oxidation zone, the catalyst in each of said zones constituting a porous refractory carrier material coated with a homogeneous mixture of 20 to 30% silver and 80 to 70% calcium carbonate of a particle size of not more than 5 microns, the said first and second stage oxidation zones being at a temperature of 200 to 300° C. and under a pressure of one to 20 atmosphere, the space velocity in the first stage zones being 7000 to 20,000 Nm.$^3$ per hour, the space velocity in the second stage zone being 2000 to 7000 Nm.$^3$ per hour.

2. The process of claim 1, carried out at 5 to 20 atmospheres in each catalytic oxidation zone.

3. The process of claim 1, each 100 ccm. of said granular refractory material containing about 35 grams of said coating, the process being carried out at 5 to 20 atmospheres in each catalytic oxidation zone.

4. In the process of producing ethylene oxide by catalytic oxidation of ethylene, which comprises mixing ethylene with air and with the larger portion of scrubbed effluent gases from the process, subjecting the mixture to a pressure of 5 to 20 atm., passing said compressed mixture through a first bed of a carrier-based silver catalyst consisting of particles of a porous refractory material as the carrier, coated with a homogeneous mixture of 20 to 30% silver and 80 to 70% calcium carbonate of a particle size of not more than 5 microns, each 100 ccm. of said granular refractory material containing about 35 g. of said coating, maintaining said catalyst bed at a temperature of 200 to 300° C., scrubbing effluent gases to remove ethylene oxide and recycling a larger portion of the scrubbed effluent gases for said mixing with ethylene and air, the improvement of passing said compressed mixture at a spatial velocity of 7000 to 20,000 Nm.$^3$ per hour through said first bed of a carrier-based silver catalyst, and passing the remaining smaller portion of said scrubbed effluent gases through a second bed of said carrier-based silver catalyst maintained at a temperature of 200 to 300° C.

5. The improvement according to claim 4, wherein said remaining smaller portion of the scrubbed effluent gas is passed at a spatial velocity of 2000 to 7000 Nm.$^3$ per hour through said second bed of carrier-based silver catalyst.

6. The improvement according to claim 4, wherein said remaining smaller portion of the scrubbed effluent gases is about one-tenth of said gases.

7. In the process of producing ethylene oxide by catalytic oxidation of ethylene, which comprises subjecting a gaseous mixture of about 4.0% ethylene, 6.0% oxygen, 6.2% carbon dioxide and 83.8% nitrogen and consisting of a mixture of ethylene, air and the larger portion of scrubbed effluent from the process to a pressure of about 12 atm., passing said compressed mixture through a first bed of a carrier-based silver catalyst consisting of particles of a porous refractory material as the carrier, coated with a homogeneous mixture of 20 to 30% silver and 80 to 70% calcium carbonate of a particle size of not more than 5 microns, each 100 ccm. of said granular refractory material containing about 35 g. of said coating, maintaining said catalyst bed at a temperature of 245° C., scrubbing effluent gases to remove ethylene oxide and recycling said larger portion of the effluent gases for said mixing with ethylene and air, the improvement of passing said compressed mixture at a spatial velocity of 8000 Nm.$^3$ per hour through said first bed of a carrier-based silver catalyst, and passing said remaining smaller portion of the scrubbed effluent gases, adjusted to about one-tenth of all of the scrubbed effluent gases and consisting of about 2.7% ethylene, 4.7% oxygen, 6.9% carbon dioxide and 85,6% nitrogen, at a spatial velocity of about 2000 Nm.³ per hour through a second bed of said carrier-based silver catalyst maintained at a temperature of about 245° C.

8. The improvement according to claim 7, wherein air is added to said smaller portion of the scrubbed effluent gases to adjust the oxygen content to 6.0%.

9. Process for making ethylene oxide by catalytic oxidation of ethylene, which comprises mixing fresh ethylene with an excess of fresh air over the amount necessary to oxidize said ethylene to ethylene oxide and with at least ten times the amount thereof of effluent gases from the process, the effluent gases having been scrubbed to remove ethylene oxide, the amount used being the larger portion of scrubbed effluent gases from the process, passing said mixture through the bed of a carrier-based catalyst, at a space velocity of 7500 to 10,000 Nm.³/hour per every m.³ of the bed, said catalyst consisting of particles at least about 9 mm. in diameter of a granular, porous refractory material as the carrier, coated with a homogeneous mixture of 20 to 30% of silver and silver oxides and 80 to 70% alkaline earth carbonate of a particle size of not more than 5 microns, each 100 ccm. of said granular refractory material containing about 35 g. of said coating, maintaining said catalyst bed at a temperature between about 240 to 260° C., scrubbing effluent gases to remove ethylene oxide and recycling a larger portion of the scrubbed effluent gases for said mixing with ethylene and air as aforesaid, and passing a portion of the scrubbed effluent gases over silver catalyst in a second reaction zone at a lower space velocity.

References Cited in the file of this patent
UNITED STATES PATENTS

| | | |
|---|---|---|
| 2,241,019 | Metzger | May 6, 1941 |
| 2,367,169 | Gardner | Jan. 9, 1945 |
| 2,458,266 | Heider et al. | Jan. 4, 1949 |
| 2,554,459 | Heider | May 22, 1951 |
| 2,693,474 | Egbert | Nov. 2, 1954 |
| 2,752,363 | Drummond et al. | June 26, 1956 |
| 2,825,701 | Endler et al. | Mar. 4, 1958 |